Sept. 27, 1960      L. P. GARVEY      2,953,801
WINDSHIELD WASHER PUMP

Filed Sept. 24, 1956      3 Sheets-Sheet 1

INVENTOR.
Louis P. Garvey
BY
D. C. Staley
HIS ATTORNEY

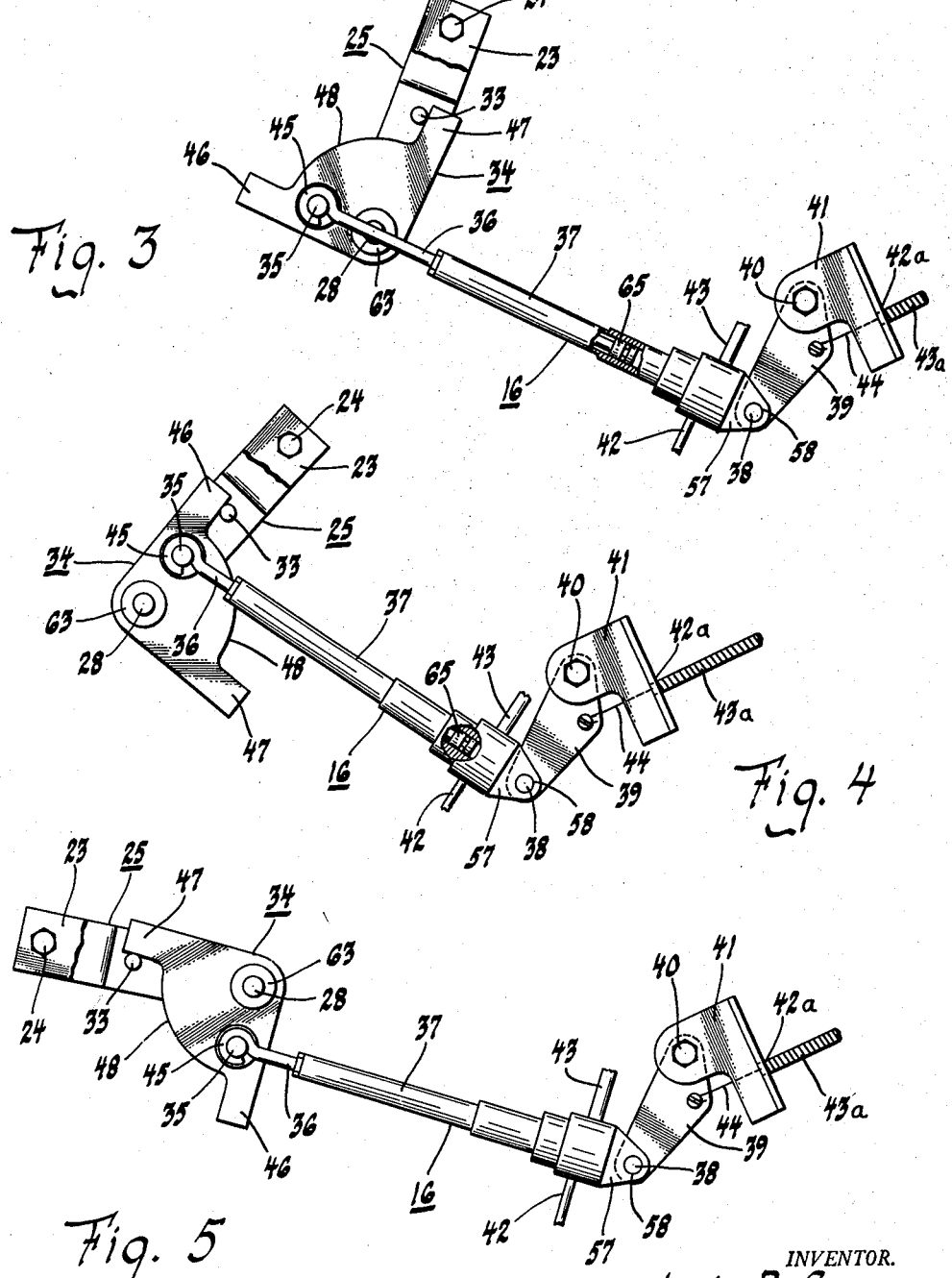

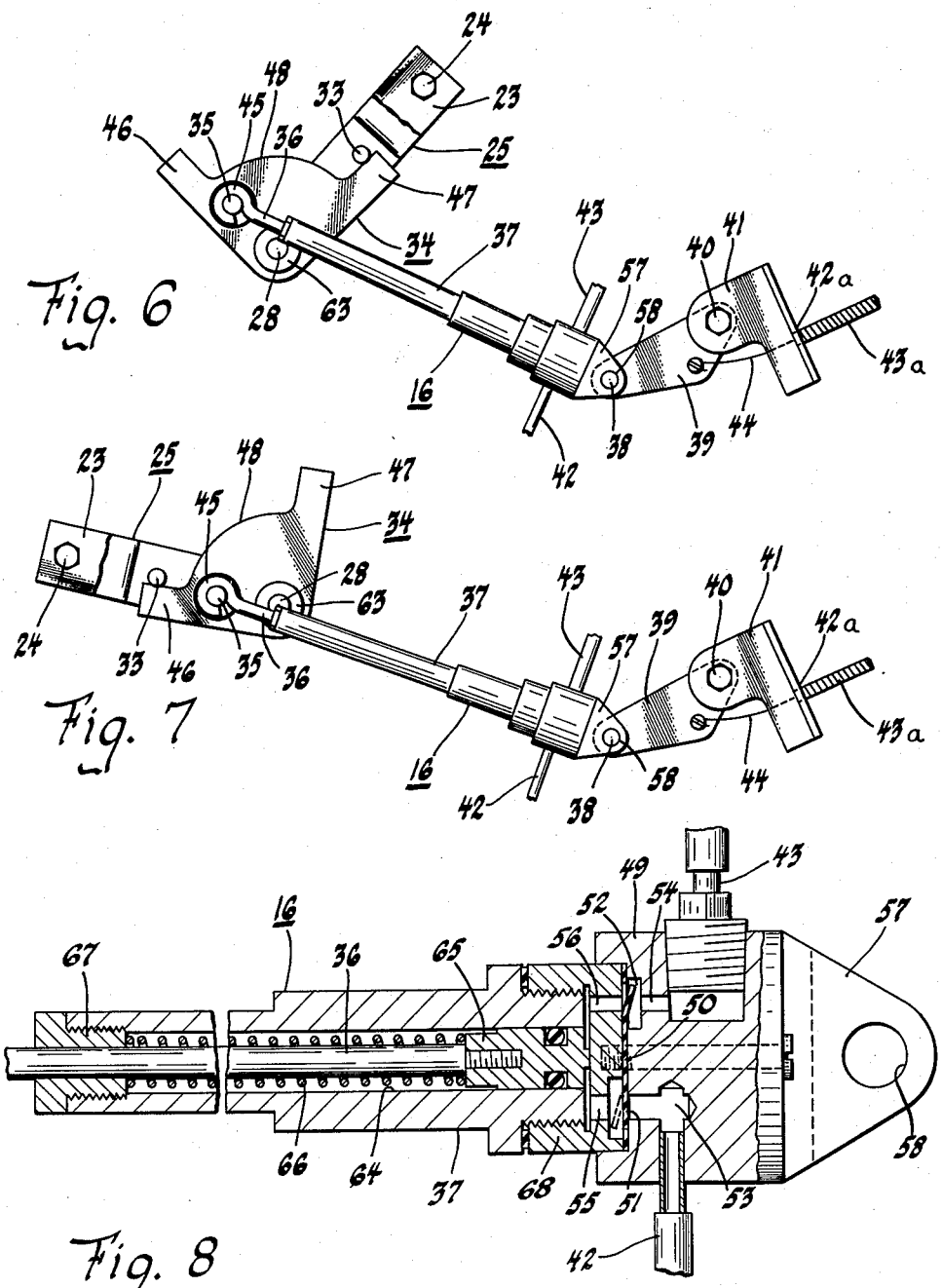

United States Patent Office 2,953,801
Patented Sept. 27, 1960

2,953,801

WINDSHIELD WASHER PUMP

Louis P. Garvey, Detroit, Mich., assignor to General Motors Corporation, Detroit, Mich., a corporation of Delaware Filed Sept. 24, 1956, Ser. No. 611,433

16 Claims. (Cl. 15—250.02)

This invention pertains to the art of window cleaning, and particularly to improved mechanism for cleaning vehicle windshields.

Heretofore, windshield cleaning apparatus including a washer pump for discharging a continuous stream of liquid solvent onto the windshield of a vehicle in timed relation, or coordinated with, movement of a wiper blade thereacross, has been developed and commercially used. However, with the presently available apparatus, a large percentage of the solvent is not efficiently utilized due to the low pump discharge pressure and ineffective coodination between solvent discharge and the wiper blade movement. Thus, the solvent reservoirs have to be constantly refilled to assure operability of the washer mechanism. The present invention relates to intermittent discharge pump mechanism of small capacity and high discharge pressure which is mechanically coordinated with the movement of the wiper blades so as to discharge a small volume of solvent onto the windshield during each stroke of the wiper blade. Accordingly, among my objects are the provision of the mechanically operated actuated pump for windshield cleaning apparatus; the further provision of a windshield cleaning system including an intermittent squirt pump which is coordinated with the movement of a wiper blade; a further provision of windshield cleaning apparatus including pump means actuated by a wiper motor in timed relation therewith; and a still further provision of control means for actuating and deactivating a mechanically actuated washer pump.

The aforementioned and other objects are accomplished in the present invention by incorpating an over-center spring actuating mechanism for the washer pump, which actuating mechanism is driven by the wiper motor transmission together with manually operable means for selectively activating or deactivating the pump actuating mechanism. Specifically, the windshield cleaning apparatus of this invention includes a wiper motor, which may be of the vacuum, hydraulic or electric type, having an oscillatory output shaft. The oscillatory output shaft of the motor is operatively connected through transmission means with an oscillatable shaft of a drive assembly. The oscillatable drive assembly shaft has connected thereto a cable retainer to which the ends of the cable drive are attached for effecting asymmetrical movement of a pair of spaced wiper shaft, arm and blade assemblies.

The motor shaft has attached thereto a driving link, the outer end of which is attached to a connecting link. The driving and connecting links have spaced apart portions and constitute the transmission means alluded to hereinbefore. Hence, the other end of the connecting link is attached to the shaft of the drive assembly. A cam member is rotatably supported on the drive shaft between the driving and connecting links. The cam member has a pair of angularly spaced abutments thereon, which cooperate with an axially extending pin on the connecting link. The cam member has an axally extending pin thereon at a point radially spaced from the axis of the drive shaft.

The washer pump comprises an elongate cylinder having a reciprocable piston therein. The piston is connected to a rod that extends therein without the cylinder, the rod being encompassed by a spring. One end of this spring engages the piston and the other end of the spring engages the cylinder and cap, or bushing. The other end of the piston rod is formed with a hook which pivotally engages the pin on the cam member. The pump also includes a valve housing containing an inlet and outlet check valves, and a base which is pivotally attached to a link. The link is in turn pivotally supported on a bracket attached to the firewall of the vehicle. The link is connected to one end of a Bowden wire which can be manipulated by the vehicle operator to activate, or deactivate, the pump.

When the pump link is moved to the operating position, the piston rod is extended during a portion of the oscillatory stroke of the drive link due to engagement of the pin with one of the cam abutments. During this movement, the spring is compressed and the intake stroke of the pump is accomplished. When the cam is moved over-center, i.e., when the line connecting the pump pivot and the cam pin passes the axis of the cam, the spring effects the discharge stroke of the pump. In so doing, the cam is moved about its axis until the other cam abutment engages the pin on the connecting link. This action occurs during each stroke of the oscillating drive link and, thus, solvent is intermittently deposited on the windshield during each stroke of the wiper blade. When the pump link is moved to the non-operating position, the cam does not impart sufficient movement to the piston rod to effect operation thereof. This result is accomplished due to the lost motion obtained by the spaced cam abutments. Thus, the cam is only oscillated a few degrees on either side of the center position since the abutments are spaced 90° apart and oscillatory link moves throughout an amplitude of approximately 120°. However, when the link is moved to the operating position the cam oscillates about 105° on either side of the center.

Further objects and advantages of the present invention will be apparent from the following description, reference being had to the accompanying drawings, wherein a preferred form of the present invention is clearly shown.

In the drawings:

Figures 3, 4 and 5 are fragmentary views illustrating operation of the washer pump mechanism of this invention;

Figures 6 and 7 are fragmentary views illustrating the pump mechanism in the non-operating position.

Figure 8 is a fragmentary sectional view of the pump, per se.

Figure 1:
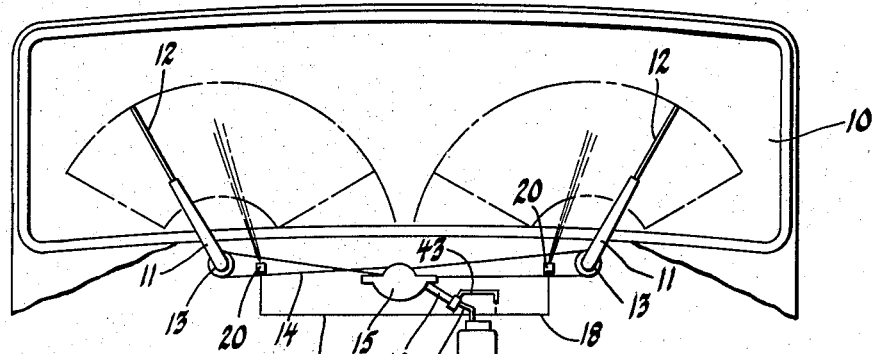
Figure 1 is a schematic view of a vehicle having the windshield apparatus of this invention.

With particular reference to Figure 1, the vehicle is shown including a windshield 10 having a pair of wiper blade assemblies movable in asymmetrical relation across the outer surface of the windshield. The wiper blade assemblies include arms 11 which are connected to blades 12, the arms 11 being connected to pulleys 13. The pulleys are connected by a cable transmission 14 to an oscillatory drive member actuated by a wiper motor 15. As will be pointed out more particularly hereinafter, the wiper motor also actuates a washer pump designated by the numeral 16 having an intake line connected to a reservoir 17 of liquid solvent, and a pair of discharge lines 18 and 19 with space nozzles 20 arranged to discharge liquid solvent onto the windshield into the path of the moving wiper blades 12.

Figure 2:
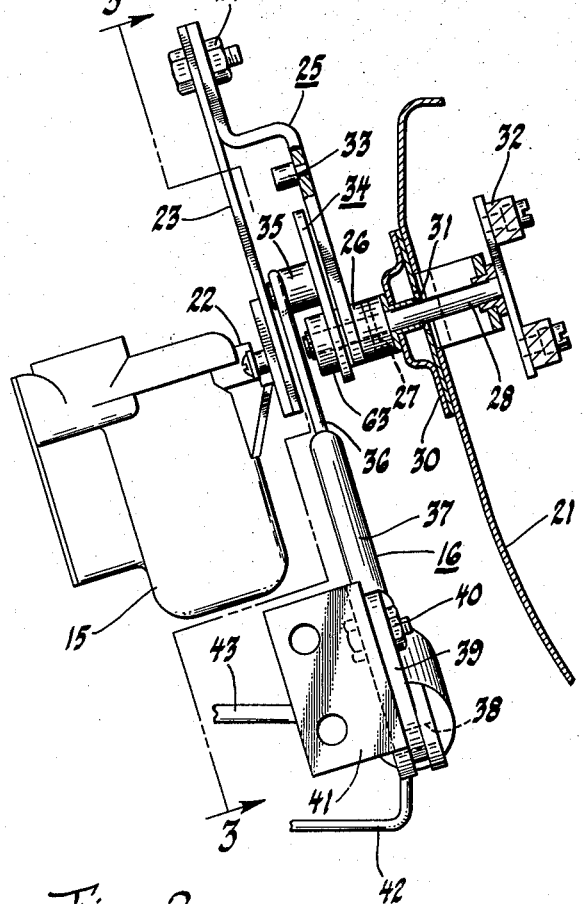
Figure 2 is an enlarged view partly in section, and partly in elevation depicting the improved cleaning mechanism of this invention.

With particular reference to Figure 2, numeral 21 designates a portion of the vehicle firewall. The wiper motor 15 which may be of the pneumatic, hydraulic, or electric type, includes an oscillatory output shaft 22 which is connected to one end of a driving link 23. The driving link extends radially away from the motor shaft 22 which, in a conventional manner is oscillated throughout an arc of a predetermined amplitude during wiper motor operation. The free end of the driving link 23 is connected by means of a nut and bolt 24 to one end of a connecting link 25. The connecting link has an intermediate angled portion as shown in Figure 2, and the other end of the connecting link is attached to a hub 26 which is connected by means of a pin 27 with an oscillatory drive shaft 28. The drive shaft 28 is journaled by bearing means 29 carried by a bracket 30 attached to the firewall 21. In addition, the drive shaft 28 passes through an aperture 31 in the firewall and has attached thereto a cable coupling member 32.

The connecting link 25 has a pin 33 attached thereon. In addition, the drive shaft 28 has rotatably journaled thereon a hub 63 to which a cam member 34 is attached. The cam member has a pin 35 eccentrically attached thereto around which one end of a rod 36 is disposed. A rod 36 is attached to a piston disposed within the pump cylinder 37, and will be described more particularly hereinafter.

The pump cylinder 37 is pivoted at 38 to a link 39. The link 39 is, in turn, pivoted at 40 to a bracket 41. The bracket 41 is secured to the vehicle firewall 21, by suitable means, not shown. The pump cylinder 37 has extending therefrom a pair of conduits while the conduit 43 connects with lines 18 and 19 of the solvent discharge system as depicted schematically in Figure 1.

With particular reference to Figure 8, the pump cylinder 37 is formed with a bore 64 having disposed therein a reciprocable piston 65 which is attached to one end of the rod 36. The rod 36 is encompassed by a compression spring 66, one end of which engages the piston 65, and the other end of which engages an end cap, or bushing 67, for the cylinder 37. The head end of the piston 65 communicates with a valve seat member which is sandwiched between a cylinder 37 and a valve body 49. The valve body carries a rubber element 50 having a pair of check valves 51 and 52, which act as one-way inlet and outlet check valves, respectively. The inlet check valve controls communication between passages 53 in the valve body and passages 55 in the valve seat member 68 which communicate with the cylinder bore 64. The outlet check valve 52 controls communication between passages 54 in the valve body and passages 56 in the valve seat member. The inlet passage 53 in the valve body connects with the conduit 42, while the passage 54 in the valve body connects with the conduit 43. As seen in Figure 8, the valve body 49 is formed with a clevis 57 having an aperture 58 therein through which the pivot means 38 shown in Figure 2 extend. Thus, the washer pump is pivotally mounted with respect to the firewall 21.

With particular reference to Figure 3, it can be seen that the bracket 41 which pivotally supports the link 39 by means of pivot member 40, is apertured at 42a, and has secured thereto one end of a Bowden wire conduit 43a. The Bowden wire conduit encloses a control wire 44, the end of which is attached to the link 39. The other end of the control wire 44 is connected to a suitable knob on the instrument panel of the vehicle, not shown. When the control wire 44 is moved to the position shown in Figures 3–5, the link 39 is pivoted in a counterclockwise direction about the pivot member 40 as shown. When the control wire 44 is extended, the link 39 is pivoted relative to the bracket 41 to the position shown in Figures 6 and 7. With the operating link 39 in the position of Figures 3–5, the pump mechanism will be operative to discharge liquid solvent during each stroke of the windshield wiper blade 12. However, with the link 39 in the position of the Figures 6 and 7, the windshield washer pump will be non-operative, and will not discharge liquid solvent onto the windshield.

As seen in Figure 3, the rod 36 has a hooked end 45 which encompasses the pin 35 attached to the cam member 34. The cam member 34 is formed with a pair of spaced abutments 46 and 47. As seen in Figure 3, the abutments 46 and 47, which are spaced by arcuate surface 48, are located at substantially 90° apart. Moreover, as alluded to hereinbefore the cam member 34 is rotatably journaled by hub 63 on the oscillatable drive shaft 28. In addition, the pin 33 attached to the connecting link 25 is adapted to coact with the spaced abutments 46 and 47, by engagement therewith so as to impart movement to the cam member 34.

The connecting link 25 which is driven by the motor 15, oscillates throughout an amplitude of substantially 120°. One stroke end limit of the connecting link 25 is depicted in Figure 4, and the other stroke end limit is depicted in Figure 5. During movement of the link 25 from the position of Figure 5 to the position of Figure 3, the piston rod 28 is extended, thereby compressing the spring 46 as shown in Figure 8. As soon as the connecting link 25 moves the cam member so that the pin 35 crosses the center of the line interconnecting the shaft 28 and the pivot 38, the spring 47 which has been compressed, will be moved over-center and thus effect inward movement of the piston rod 37, thereby moving the cam member 34 to the position of Figure 4. During this movement, the discharge stroke of the pump is effected, and liquid solvent is discharged onto the windshield.

When the connecting link 25 moves from the position of Figure 4 towards the position of Figure 5, the abutment pin 33 will engage the abutment 46 thereby again extending the piston rod 37 so as to effect the intake stroke of the pump. As soon as the pin 35 is moved over the center of the line interconnecting the axis of shaft 28 and the axis of the pivot 38, the spring 46 will again effect the delivery stroke of the pump. Thus, during each stroke of the windshield wiper blades 12, a squirt, or pulse, of liquid solvent is discharged onto the windshield. Moreover, by virtue of the novel pump construction of this invention, the pulse of hydraulic fluid is under high pressure and will not be dissipated by wind.

To deactivate the pump, the Bowden control wire 44 is extended to the position of Figures 6 and 7, thereby pivoting the link 39 about the pivot point 40. In so doing, during oscillatory movement of the connecting link 25, throughout 90°, or the space between abutments 46 and 47, no movement is imparted to the cam member 34. However, when the pin 33 strikes abutment 47, the piston 37 will be slightly extended and immediately moved over-center. However, this over-center movement is insufficient to discharge liquid solvent onto the windshield. Similarly, during counterclockwise movement of the connecting link 25, insufficient movement is imparted to the piston rod so as to discharge liquid solvent therefrom. Thus, the mechanically actuated washer pump can be effectively inactivated and activated by movement of the link 39 as controlled by the Bowden wire.

From the aforegoing, it is readily apparent that the present invention provides a unique mechanically actuated pump assembly for use with windshield cleaning apparatus. Moreover, the device is mechanically coordinated with movement of the wiper blades and is foolproof in operation and construction. Moreover, with the instant pump assembly, the liquid solvent is effectively utilized to clean the windshield, rather than ineffectively drain off the windshield before the wiper blade is able to spread it thereacross.

While the form of embodiment of the invention as herein disclosed constitutes a preferred form, it is to be understood that other forms might be adopted, as may come within the scope of the claims which follow.

What is claimed is as follows:

1. Windshield cleaning apparatus including, a wiper motor, a washer pump having a cylinder, a liquid displacing member disposed in said cylinder having an intake stroke and a delivery stroke, power means continuously acting on said member for effecting one stroke thereof, and mechanical means connected with said liquid displacing member and having an interruptible driving connection with said wiper motor for effecting the other stroke thereof during operation of said wiper motor.

2. Windshield cleaning apparatus including, a wiper motor, a washer pump having a cylinder, a liquid displacing member disposed within said cylinder having an intake stroke and a delivery stroke, energy storing means acting constantly upon said member for effecting the delivery stroke thereof, and mechanical means connected with said liquid displacing member and having an interruptible driving connection with said wiper motor for effecting the intake stroke thereof during operation of said wiper motor.

3. Windshield cleaning apparatus including, a wiper motor, a washer pump having a cylinder, a reciprocable piston disposed in said cylinder having an intake stroke and a delivery stroke, energy storing means acting constantly upon said piston for effecting the delivery stroke thereof, and a rod attached to said piston and having an interruptible driving connection with said wiper motor for effecting the intake stroke thereof during operation of said motor, and automatically permitting said energy storing means to effect the delivery stroke thereof.

4. A windshield washer pump including, a cylinder, a reciprocable piston in said cylinder, a rod attached to said piston and extending outside of said cylinder, resilient means engaging said piston for effecting one stroke thereof, means pivotally supporting said pump cylinder, and rotatable means having an eccentric pivotal connection with said rod for effecting the other stroke of said pump and storing energy in said resilient means, said resilient means being automatically operative to effect said one stroke when the rotatable means has moved said rod on either side of a line connecting the cylinder pivot and the axis of said rotable means.

5. A windshield washer pump including, a cylinder, a reciprocable piston disposed in said cylinder, a rod attached to said piston and extending outside of said cylinder, energy storing means acting constantly on said piston for effecting the delivery stroke thereof, means pivotally mounting said pump cylinder, and rotatable means having an eccentric pivotal connection with said rod for effecting the intake stroke of said piston and storing energy in said energy storing means, said energy storing means being automatically operative to effect said delivery stroke when the rotatable means moves the rod on either side of a line connecting the cylinder pivot and the axis of the rotatable means.

6. A windshield washer pump including, a cylinder, a reciprocable piston disposed in said cylinder, a rod attached to said piston and extending outside of said cylinder, energy storing means acting constantly on said piston for effecting the delivery stroke thereof, means pivotally mounting said pump cylinder, rotatable means having an eccentric pivotal connection with said rod for effecting the intake stroke of said piston and storing energy in said energy storing means, said energy storing means being automatically operative to effect said delivery stroke when the rotatable means moves the rod on either side of a line connecting the cylinder pivot and the axis of the rotatable means, and means for adjusting the position of said cylinder so as to prevent operation of said pump.

7. A windshield washer pump including, a cylinder, a liquid displacing member in said cylinder having an intake and a delivery stroke, energy storing means acting constantly on said member for effecting one stroke thereof, a rod connected to said liquid displacing member and extending outside of said cylinder, a link pivotally mounting said pump cylinder, and rotatable means having an eccentric pivotal connection with said rod for effecting the other stroke of said member and storing energy in said energy storing means, said energy storing means being automatically operative to effect said one stroke when the rotatable means moves the rod on either side of a line interconnecting the cylinder pivot and the axis of said rotatable means.

8. The combination set forth in claim 7 including means for imparting oscillatory movement to said rotatable means.

9. The combination set forth in claim 7 including means for displacing said cylinder so as to render the rotatable means inoperative to effect operation of said pump.

10. Windshield cleaning apparatus including, in combination, a wiper motor having an oscillatory output shaft, a washer pump having a cylinder with a liquid displacing member therein with an intake stroke and a delivery stroke, a rotatable element having its axis of rotation coincident with said motor shaft, means for imparting rotation to said element from said motor shaft, said liquid displacing member having a rod extending outside of said cylinder, means pivotally interconnecting the said rod and said element at a point spaced from the axis thereof, means pivotally mounting said pump cylinder, energy storing means acting constantly upon said liquid displacing member for effecting one stroke thereof, and means whereby rotation of said element effects the other stroke thereof and automatically renders the energy storing means operative to effect the one stroke thereof.

11. Windshield cleaning apparatus including, a wiper motor having an oscillatory output shaft, a washer pump, and means operatively interconnecting said wiper motor shaft and the pump for effecting an intake and delivery stroke thereof during oscillatory movement of said shaft in each direction.

12. Vehicle windshield cleaning apparatus including, a wiper motor having an oscillatory output member, a washer pump for discharging liquid solvent onto the windshield of the vehicle in a timed relation with said wiper motor, means operatively interconnecting said washer pump and said motor for effecting an intake and a delivery stroke thereof during movement of said oscillatory member in each direction, and means for interrupting the operative connection between said wiper motor and said pump so as to disable said pump.

13. Windshield cleaning apparatus for a vehicle including, a pair of spaced wiper blades, a wiper motor having an output member, means interconnecting the wiper motor member and said blades for effecting oscillation of said blades throughout a predetermined stroke, a washer pump for delivering liquid solvent onto said windshield, and means operatively connecting said wiper motor member and said pump for effecting an intake stroke and a delivery stroke of said pump during each stroke of said wiper blades.

14. Windshield cleaning apparatus including, a pair of spaced wiper blades, a wiper motor having an output shaft, means interconnecting said shaft and said wiper blades for imparting oscillation thereto throughout a predetermined stroke, a washer pump, means operatively interconnecting said washer pump and said output shaft for effecting an intake stroke and a delivery stroke of said pump during each stroke of said wiper blades, and means for effectively disabling the operative connection between said shaft and said pump.

15. Windshield cleaning apparatus including, a wiper motor having an oscillatory output shaft, a drive link connected to the oscillatory output shaft, a connecting link connected to the drive link, an oscillatory drive shaft connected to said connecting link, a washer pump having a delivery stroke and an intake stroke, an element rotatably journaled on said drive shaft and having a pair of spaced abutments thereon, a pin on said connecting link and cooperable with said abutments for imparting angular movement to said element, said pump including a liquid displacing member having a rod extending therefrom, said rod being pivotally connected to said element at a point spaced from the axis thereof, and means for positioning the said pump so as to effect an intake and a delivery stroke thereof during oscillatory movement of said motor shaft in each direction.

16. Windshield cleaning apparatus including, a wiper motor having an oscillatory output shaft, a connecting link operatively connected to said shaft and oscillatable therewith, a drive shaft, means interconnecting the connecting link and said drive shaft, a washer pump having a liquid displacing member with a delivery stroke and an intake stroke, a rod attached to said member and extending without the cylinder, an element rotatably journaled on said drive shaft, said rod having an eccentric pivotal connection with said element, means constituting a lost motion connection between said connecting link and said element for imparting movement thereto, and energy storing means acting constantly upon said liquid displacing member for effecting one stroke thereof, said element storing energy in said energy storing means and releasing the same to effect a complete cycle of pump operation during oscillatory movement of said motor shaft in each direction.

References Cited in the file of this patent

UNITED STATES PATENTS

| | | |
|---|---|---|
| 1,088,608 | Mitchell | Feb. 24, 1914 |
| 1,738,884 | Gearhart | Dec. 10, 1929 |
| 2,059,224 | French | Nov. 3, 1936 |
| 2,126,624 | Eaddy | Aug. 9, 1938 |
| 2,206,814 | Horton | July 2, 1940 |
| 2,688,514 | Oishei et al. | May 1, 1954 |
| 2,722,455 | Oishei | Nov. 1, 1955 |
| 2,743,473 | Oishei | May 1, 1956 |
| 2,856,901 | Kvarnstrom | Oct. 21, 1958 |